(12) United States Patent  
Park et al.

(10) Patent No.: US 11,420,490 B2
(45) Date of Patent: Aug. 23, 2022

(54) INDEPENDENT SUSPENSION SYSTEM

(71) Applicants: HYUNDAI MOTOR COMPANY, Seoul (KR); KIA CORPORATION, Seoul (KR)

(72) Inventors: Jeong Hwan Park, Seoul (KR); Do Hyun Kong, Gwangmyeong-si (KR); Jae Hun Kim, Hwaseong-si (KR); Tae Woong Park, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/347,946

(22) Filed: Jun. 15, 2021

(65) Prior Publication Data

US 2022/0153074 A1    May 19, 2022

(30) Foreign Application Priority Data

Nov. 19, 2020   (KR) ......................... 10-2020-0155436

(51) Int. Cl.
*B60G 17/00* (2006.01)
*B60G 3/20* (2006.01)
(Continued)

(52) U.S. Cl.
CPC .............. *B60G 3/207* (2013.01); *B60G 7/001* (2013.01); *B60G 17/00* (2013.01); *B62D 9/00* (2013.01);
(Continued)

(58) Field of Classification Search
CPC ........ B60G 3/207; B60G 7/001; B60G 17/00; B60G 2200/13; B60G 2200/18; B60G 2204/41; B60G 2204/419; B60G 2204/4192; B60G 2500/20; B60G 2800/162; B60G 2800/24; B62D 9/00

See application file for complete search history.

(56) References Cited

U.S. PATENT DOCUMENTS 8,820,680 B2 * 9/2014 Ferraz ..................... B64C 25/14
                                                        244/102 A
9,387,902 B2 * 7/2016 Kroening, Jr. ......... B62K 5/027
(Continued)

FOREIGN PATENT DOCUMENTS

JP         2005-112300 A        4/2005

*Primary Examiner* — Toan C To
(74) *Attorney, Agent, or Firm* — Morgan, Lewis & Bockius LLP

(57) ABSTRACT

An independent suspension system includes: a steering unit configured to adjust the steering angle of a wheel; a shock absorber engaged with the wheel in order to absorb impacts applied to the wheel and including a first shock absorber and a second shock absorber, each of which being arranged in a forward-rearward direction on opposite side surfaces of the wheel; and a link unit disposed between the shock absorber and the steering unit in order to vary the distance between the wheel and the steering unit. The link unit includes a first upper arm disposed between the first shock absorber and the steering unit, a second upper arm disposed between the second shock absorber and the steering unit, and a ground clearance adjustment unit engaged with the first and second upper arms in order to vary the distance between the first and second upper arms.

12 Claims, 5 Drawing Sheets

(51) Int. Cl.
*B62D 9/00* (2006.01)
*B60G 7/00* (2006.01)

(52) U.S. Cl.
CPC ...... *B60G 2200/13* (2013.01); *B60G 2200/18* (2013.01); *B60G 2204/41* (2013.01); *B60G 2204/419* (2013.01); *B60G 2204/4192* (2013.01); *B60G 2500/20* (2013.01); *B60G 2800/162* (2013.01); *B60G 2800/24* (2013.01)

(56) References Cited

U.S. PATENT DOCUMENTS

| | | | |
|---|---|---|---|
| 9,409,457 B2 * | 8/2016 | Gielisch | B60G 15/06 |
| 2003/0102176 A1 * | 6/2003 | Bautista | B62K 5/027 |
| | | | 280/124.103 |
| 2005/0280236 A1 * | 12/2005 | Vallejos | B60G 3/01 |
| | | | 280/124.11 |
| 2008/0185807 A1 * | 8/2008 | Takenaka | B60G 3/14 |
| | | | 280/124.153 |
| 2008/0271938 A1 * | 11/2008 | Gulak | B62K 11/00 |
| | | | 74/5.34 |
| 2011/0174924 A1 * | 7/2011 | Ferraz | B64C 25/14 |
| | | | 244/102 A |
| 2018/0334002 A1 * | 11/2018 | Kato | B62K 25/20 |
| 2020/0369341 A1 * | 11/2020 | Breazlan | B62K 27/08 |
| 2021/0260947 A1 * | 8/2021 | Sardes | B60G 3/185 |
| 2021/0269116 A1 * | 9/2021 | Butenko | B62D 51/02 |

\* cited by examiner

FIG. 1 -PRIOR ART-
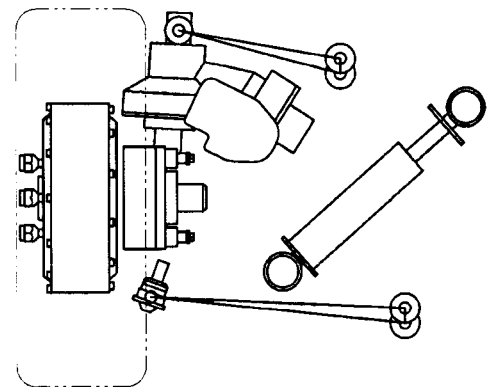
FIG. 2
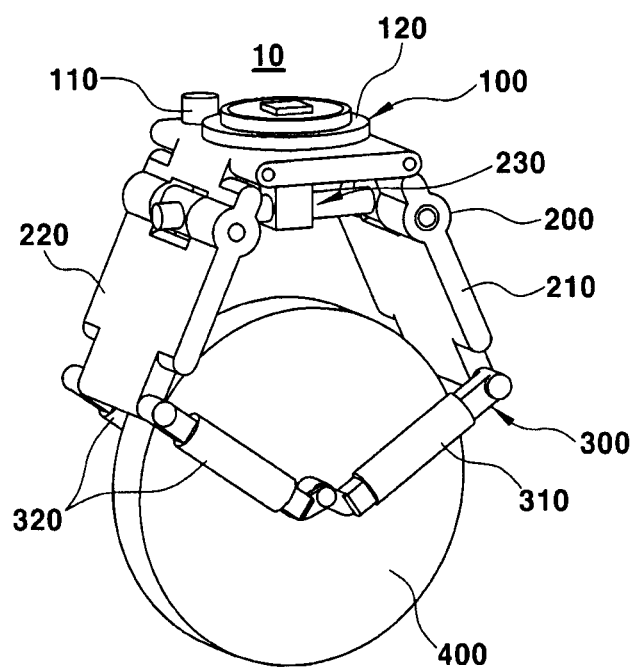

INDEPENDENT SUSPENSION SYSTEM

CROSS-REFERENCE TO RELATED APPLICATION

This application claims the benefit of priority to Korean Patent Application No. 10-2020-0155436 filed on Nov. 19, 2020, the entire contents of which are incorporated herein by reference.

TECHNICAL FIELD

The present disclosure relates to an independent suspension system. More particularly, the present disclosure relates to an independent suspension system that is engaged with each wheel of a vehicle and has a structure for varying the distance between a vehicle body and the wheel, thereby providing improved ride comfort to an occupant.

BACKGROUND

A conventional vehicle suspension system connects an axle and a vehicle body in order to prevent vibration or impact, which the axle receives from the road surface while the vehicle is running, from being directly transferred to the vehicle body, thereby preventing damage to the vehicle body or cargo and improving ride comfort. In general, a suspension system includes a suspension spring, which mitigates impacts received from the road surface, a shock absorber, which dampens vibration of the suspension spring in order to improve ride comfort, and a stabilizer, which suppresses rolling of the vehicle.

A commercial vehicle mainly uses a solid-axle suspension system, in which the left wheel and the right wheel are connected via a single axle. A leaf spring or an air spring is mainly used as a suspension spring.

A steering system of a commercial vehicle, which uses a solid-axle suspension system, includes a pitman arm, which is rotatably mounted to an output shaft of a steering gear, a drag link, which transmits the movement of the pitman arm to a knuckle arm, the knuckle arm receiving movement of the drag link to operate a knuckle spindle, and a tie rod, which connects a left knuckle arm and a right knuckle arm.

In a commercial vehicle equipped with the solid-axle suspension system using an air spring and the steering system described above, the air spring merely serves as a substitute for a leaf spring, and does not greatly contribute to improving ride comfort or steering characteristics. In addition, it is difficult to achieve precise geometry and to increase design freedom due to the structural characteristics thereof.

In recent years, there has been developed an independent-steering-type suspension system, in which a steering angle of a wheel is input to each suspension system through a motor assembly. However, the independent-steering-type suspension system described above has a problem in that a shock absorber needs to protrude in the height direction of a vehicle so as to be aligned with a steering shaft of the motor assembly.

In addition, as shown in FIG. 1, in the case in which one end of a shock absorber is fixed to a vehicle body frame, variation in the length of the shock absorber when the wheel travels over a bump is small, leading to deterioration in ride comfort.

For this reason, in recent years, there has been required a suspension system capable of providing improved ride comfort in various travel environments by varying the height between a wheel and a vehicle body.

The above information disclosed in this Background section is only for enhancement of understanding of the background of the disclosure, and therefore it may contain information that does not form the related art that is already known in this country to a person of ordinary skill in the art.

SUMMARY OF THE DISCLOSURE

The present disclosure has been made in an effort to solve the above-described problems associated with the related art, and it is an object of the present disclosure to provide an independent suspension system capable of varying the distance between a wheel and a vehicle body.

It is another object of the present disclosure to provide an independent suspension system capable of supporting left and right turning of a wheel and variation in camber.

The objects of the present disclosure are not limited to the above-mentioned objects, and other objects not mentioned herein will be clearly understood by those skilled in the art from the following description, and will become apparent with reference to the embodiments of the present disclosure. In addition, the objects of the present disclosure can be accomplished by the components described in the appended claims and combinations thereof.

In one aspect, the present disclosure provides an independent suspension system including: a steering unit configured to adjust a steering angle of a wheel in a lateral direction; a shock absorber engaged with the wheel in order to absorb impacts applied to the wheel and including a first shock absorber and a second shock absorber, each of which arranged in a forward-rearward direction on opposite side surfaces of the wheel; and a link unit disposed between the shock absorber and the steering unit in order to vary the distance between the wheel and the steering unit. The link unit includes a first upper arm disposed between the first shock absorber and the steering unit, a second upper arm disposed between the second shock absorber and the steering unit, and a ground clearance adjustment unit engaged with the first upper arm and the second upper arm in order to vary the distance between the first upper arm and the second upper arm.

The steering unit may be controlled such that a steering angle to be applied to the wheel is set by a steering input part located at a vehicle body.

The ground clearance adjustment unit may include a fixing bracket disposed in an opening in the first upper arm, a guide bracket disposed in an opening in the second upper arm, a height adjustment part engaged with the fixing bracket, and a distance adjustment screw engaged with the fixing bracket and the guide bracket, the distance adjustment screw being in contact at one end thereof with the height adjustment part so as to be rotated by driving force of the height adjustment part. The distance between the fixing bracket and the guide bracket may be varied by rotation of the distance adjustment screw.

The independent suspension system may further include a guide disposed so as to penetrate the steering unit and to be engaged with the distance adjustment screw, and the guide may be integrally moved with the distance adjustment screw in an upward-downward direction according to the direction in which the distance adjustment screw is rotated.

The fixing bracket may include fixing protrusions formed on opposite side surfaces thereof so as to be engaged with the first upper arm. When the distance adjustment screw is rotated, the fixing bracket may be rotated about the fixing protrusions relative to inclination of the first upper arm such that the distance adjustment screw is maintained in a horizontal orientation.

The guide bracket may include guide protrusions formed on opposite side surfaces thereof, and may be rotated about the guide protrusions so as to face the fixing bracket.

When the first upper arm and the second upper arm are moved close to each other with respect to ends thereof that are engaged with the steering unit, the distance between the steering unit and the wheel may be increased.

When the first upper arm and the second upper arm are moved away from so each other with respect to ends thereof that are engaged with the steering unit, the distance between the steering unit and the wheel may be reduced.

The independent suspension system may further include a wheel bush disposed at a position at which the wheel and the shock absorber are engaged with each other.

The independent suspension system may further include a support bush disposed at a position at which the shock absorber and the steering unit are engaged with each other.

Other aspects and preferred embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIG. 1 is a view showing the configuration of a conventional suspension system;

FIG. 2 is a perspective view of an independent suspension system according to an embodiment of the present disclosure;

Figure 3:
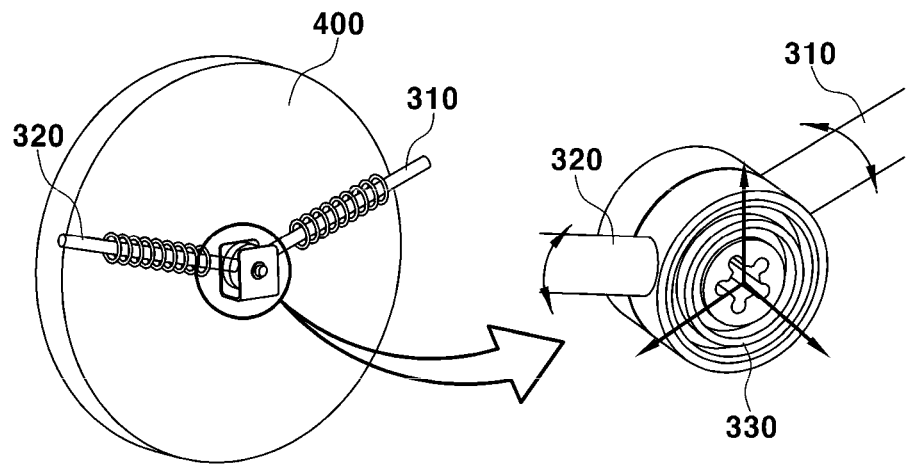
FIG. 3 is a view showing the configuration of a shock absorber of the independent suspension system according to an embodiment of the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Hereinafter, exemplary embodiments of the present disclosure will be described in detail with reference to the accompanying drawings. The present disclosure may, however, be embodied in many different forms, and should not be construed as being limited to the embodiments set forth herein. Rather, these embodiments are provided so that the disclosure will be thorough and complete, and will fully convey the scope of the disclosure to those skilled in the art.

The terms "-part", "-unit", and "-system" described in the specification mean units for processing at least one function or operation, and can be implemented as hardware components, software components, or combinations of hardware components and software components.

Further, in the following description, the terms "first" and "second" are used only to avoid confusing designated components, and do not indicate the sequence or importance of the components or the relationships between the components.

An independent suspension system of the present disclosure refers to one suspension system that is engaged with each wheel. In the case of a multi-wheel vehicle, each wheel may be provided with an independent suspension system capable of achieving independent steering.

Hereinafter, the embodiment will be described in detail with reference to the accompanying drawings. In the following description and the accompanying drawings, components having the same functional configurations are denoted by the same reference numerals, and a duplicate explanation thereof will be omitted.

The present disclosure relates to an independent suspension system provided at each wheel so as to be rotatable independently.

Moreover, the present disclosure is mounted to each wheel, and is configured to allow the steering angle of the wheel to be varied in the forward-rearward direction without limitation. The steering angle may be controlled by a controller (not shown) so that the independent suspension system mounted to each wheel is capable of being oriented at an angle different from those of other independent suspension systems. In addition, the wheel of the present disclosure may include an in-wheel motor.

In addition, the controller of the present disclosure may receive a steering input signal input to the vehicle, may receive information on the travel environment and road conditions through a sensor (not shown) mounted in the vehicle, and may vary the height of the independent suspension system.

Hereinafter, the engagement relationships between components of an independent suspension system mounted to each wheel according to an embodiment of the present disclosure will be described.

FIG. 2 is a perspective view of an independent suspension system 10 according to an embodiment of the present disclosure.

As shown, the independent suspension system 10 includes a shock absorber 300 configured to absorb impacts applied to a wheel 400, a link unit 200 engaged with the upper end of the shock absorber 300, and a steering unit 100 disposed on the upper end of the link unit 200 and including a steering input part 110 in order to control the steering angle of the wheel 400. The link unit 200 serves to vary the distance between the steering unit 100 and the wheel 400.

The shock absorber 300 is engaged with the central shaft of the wheel 400, and extends forwards and backwards on opposite side surfaces of the wheel 400. A first shock absorber 310 may be engaged with a first upper arm 210, and a second shock absorber 320 is engaged with a second upper arm 220. Each of the first shock absorber 310 and the second shock absorber 320 includes two rods that are in contact with opposite side surfaces of the wheel 400. In other words, according to an embodiment of the present disclosure, the shock absorber 300 includes four rods engaged with the central shaft of the wheel 400. Among the four rods, the two rods extending forwards are included in the first shock absorber 310, and the two rods extending backwards are included in the second shock absorber 320.

In addition to the first and second shock absorbers 310 and 320 engaged with the central shaft of the wheel 400, the shock absorber 300 includes a wheel bush 330, which is surrounded by the first shock absorber 310 and the second shock absorber 320 (see FIG. 3). The wheel bush 330 may surround the central shaft of the wheel 400, and the first shock absorber 310 and the second shock absorber 320 may surround the outer surface of the wheel bush 330. The wheel bush 330 of the present disclosure may be compressed or expanded along three axes by road shock and side force attributable to variation in steering angle.

The steering unit 100 includes a steering input part 110 fixed to a vehicle body and a frame 120 disposed adjacent to the steering input part 110 in order to enable the independent suspension system 10 to be integrally rotated. When a steering input signal is applied thereto from the controller, the steering input part 110 applies rotational force to the frame 120, and the frame 120 is integrally rotated with the wheel 400, whereby the steering angle of the wheel 400 is varied.

In an embodiment of the present disclosure, the steering input part 110 may be implemented as a motor. In another embodiment, the steering input part 110 may be implemented as a pinion gear, which is engaged with the frame 120 so that the independent suspension system 10 is integrally rotated.

The link unit 200 includes two links, which are arranged in the forward-rearward direction so as to be respectively engaged with the first shock absorber 310 and the second shock absorber 320. The link unit 200 includes a first upper arm 210 engaged with the first shock absorber 310 and a second upper arm 220 engaged with the second shock absorber 320. In addition, the link unit 200 further includes a ground clearance adjustment unit 230, which penetrates an opening in the first upper arm 210 and an opening in the second upper arm 220 and varies the distance between the steering unit 100 and the wheel 400 by varying the distance between the first upper arm 210 and the second upper arm 220.

The ground clearance adjustment unit 230 includes a fixing bracket 231, which is located in the opening in the first upper arm 210, a guide bracket 232, which is located in the opening in the second upper arm 220, and a distance adjustment screw 233, which is engaged with the fixing bracket 231 and the guide bracket 232 in the state of being disposed therebetween. The distance between the first upper arm 210 and the second upper arm 220 is varied according to the amount of rotation of the distance adjustment screw 233. To this end, the ground clearance adjustment unit 230 further includes a height adjustment part 234, which is located at the fixing bracket 231 so that the rotational force of the distance adjustment screw 233 is applied thereto. The height adjustment part 234 is in contact with the distance adjustment screw 233 so that the distance adjustment screw is rotated in both directions.

The guide bracket 232, which is in contact with the outer surface of the distance adjustment screw 233, is moved in the longitudinal direction by the rotational force of the distance adjustment screw 233. When the guide bracket 232 is moved, the second upper arm 220 engaged with the guide bracket 232 is also moved, whereby the distance between the second upper arm 220 and the first upper arm 210 is varied. That is, when the rotational force of the distance adjustment screw 233 is applied, the angle formed by one end of the first upper arm 210 and one end of the second upper arm 220, which are engaged with the steering unit 100, is varied. When the first upper arm 210 and the second upper arm 220 are located closest to each other, the distance between the steering unit 100 and the wheel 400 is maximized, and when the first upper arm 210 and the second upper arm 220 are located farthest from each other, the distance between the steering unit 100 and the wheel 400 is minimized. When the rotational force of the distance adjustment screw 233 is applied, the first upper arm 210 and the second upper arm 220 are maintained symmetrical with each other with respect to the center line in the height direction.

Furthermore, the distance adjustment screw 233 is configured such that at least a portion thereof is located inside a guide 235, which penetrates the steering unit 100. The guide 235 serves to guide variation in the position of the distance adjustment screw 233 in the height direction. The guide 235 guides variation in the position of the distance adjustment screw 233 in the height direction according to variation in the angle between the first upper arm 210 and the second upper arm 220.

FIG. 3 shows the shock absorber 300 engaged with the wheel 400 and the wheel bush 330 mounted around the central shaft of the wheel 400.

As shown, the first shock absorber 310 and the second shock absorber 320 are engaged with the central shaft of the wheel 400 on one side surface of the wheel 400. One end of the first shock absorber 310 and one end of the second shock absorber 320 are located coaxially with the central shaft of the wheel 400. The wheel bush 330 is disposed so as to surround the central shaft of the wheel 400, and the outer surface of the wheel bush 330 is surrounded by the first shock absorber 310 and the second shock absorber 320. Further, the independent suspension system 10 of the present disclosure is capable of implementing toe-in or toe-out by controlling the spring stiffness of the first shock absorber 310 composed of two rods and the spring stiffness of the second shock absorber 320 composed of two rods when braking force is generated in a vehicle.

In an embodiment of the present disclosure, one end of the first shock absorber 310 is located so as to face the wheel 400, and one end of the second shock absorber 320 is located on the side surface of the first shock absorber 310. Moreover, the wheel bush 330 is located inside the first shock absorber 310 and the second shock absorber 320. The shock absorber 300 may further include a bracket, via which the first shock absorber 310 and the second shock absorber 320 are engaged with the outer side of the central shaft of the wheel 400.

The wheel bush 330 is configured to absorb impacts applied to the rotation shaft of the wheel 400. Furthermore, the wheel bush 330 is configured to be compressed and expanded along three axes in order to absorb side force and road shock applied to the wheel 400.

Figure 4:
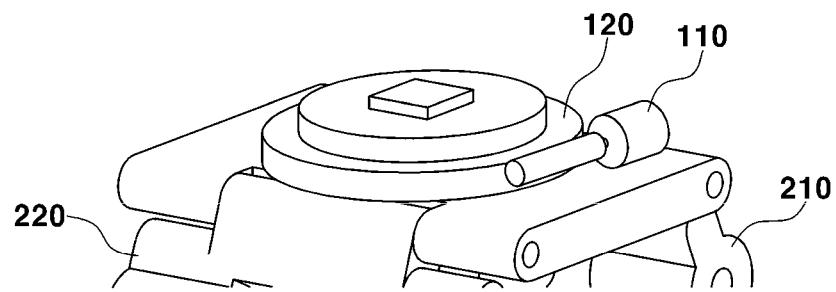
FIG. 4 is a view showing a steering unit of the independent suspension system according to an embodiment of the present disclosure.

FIG. 4 is an enlarged view of the steering unit 100 including the steering input part 110.

The steering input part 110 is engaged with the vehicle body, whereby the steering unit 100, the link unit 200, and the shock absorber 300 are integrally rotated. The steering input part 110 may be implemented as a driving motor, and may be engaged with the frame 120 via a rack gear.

As one embodiment of the present disclosure, the steering input part 110 is configured in a manner using a worm gear, and the steering unit 100 is rotated with respect to the vehicle body by the rotational force of the worm gear engaged with the motor.

The steering input part 110 described above rotates the frame 120 of the steering unit 100 in response to receipt of a users steering input by the controller, and thus the shock absorber 300 and the link unit 200, which are engaged with the steering unit 100, are integrally rotated with the steering unit 100 in a direction corresponding to the steering input of the wheel 400.

Figure 5A:
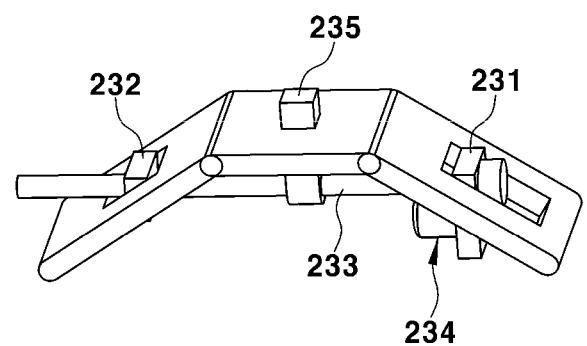
FIG. 5A is a view showing a ground clearance adjustment unit of the independent suspension system according to an embodiment of the present disclosure.

FIG. 5A shows the ground clearance adjustment unit 230 of the link unit 200 of the present disclosure.

The ground clearance adjustment unit 230 is disposed between the first upper arm 210 and the second upper arm 220, and is disposed below the steering unit 100. The ground clearance adjustment unit 230 includes a fixing bracket 231, which is located in the opening in the first upper arm 210, and a guide bracket 232, which is located in the opening in the second upper arm 220. The distance adjustment screw 233 is configured to rotate in the state of being fixed at one end thereof to the fixing bracket 231, and is disposed so as to penetrate the guide bracket 232. The outer surface of the distance adjustment screw 233 and the inner surface of the through-hole in the guide bracket 232 are in contact with each other. Therefore, the distance between the guide bracket 232 and the fixing bracket 231 is varied by rotation of the distance adjustment screw 233, and accordingly, the angle formed between the first upper arm 210 and the second upper arm 220 is varied.

One end of the distance adjustment screw 233, which is located at the fixing bracket 231, is in contact with the height adjustment part 234. The height adjustment part 234 is configured to generate the rotational force of the distance adjustment screw 233 in response to the request of the controller.

Further, the first upper arm 210 and the second upper arm 220 are arranged symmetrically with each other with respect to the center line of the steering unit 100 in the height direction. As the first upper arm 210 and the second upper arm 220 are moved closer to each other, the distance adjustment screw 233 is moved farther away from the lower surface of the steering unit 100. At least a portion of the distance adjustment screw 233 is located inside the guide 235, which penetrates the steering unit 100. The guide 235 serves to guide variation in the position of the distance adjustment screw 233 in the height direction according to variation in the distance between the first upper arm 210 and the second upper arm 220.

Figure 5B:
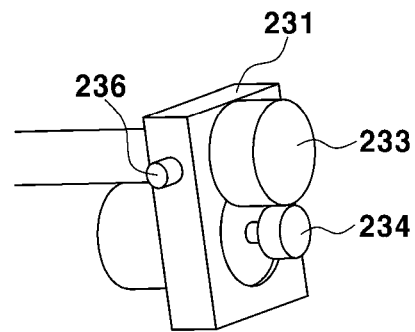
FIG. 5B is an enlarged view showing a fixing bracket of the independent suspension system according to an embodiment of the present disclosure.

As shown in FIG. 5B, the fixing bracket 231 includes fixing protrusions 236, which are formed on opposite side surfaces thereof that face the inner surface of the opening in the first upper arm 210. Due to the fixing protrusions 236, the fixing bracket 231 is rotated while being maintained perpendicular to the distance adjustment screw 233 upon variation in the angle of the first upper arm 210.

The height adjustment part 234 is located on the outer surface of the fixing bracket 231, and is engaged with one end of the distance adjustment screw 233 using gears so that the distance adjustment screw 233 is rotated by the rotational force of the height adjustment part 234.

The distance adjustment screw 233 is rotated freely relative to the through-hole in the fixing bracket 231 and the guide 235. However, since the distance adjustment screw 233 is in contact with the inner surface of the through-hole in the guide bracket 232, the guide bracket 232 is moved in the longitudinal direction of the distance adjustment screw 233 when the distance adjustment screw 233 is rotated.

Figure 5C:
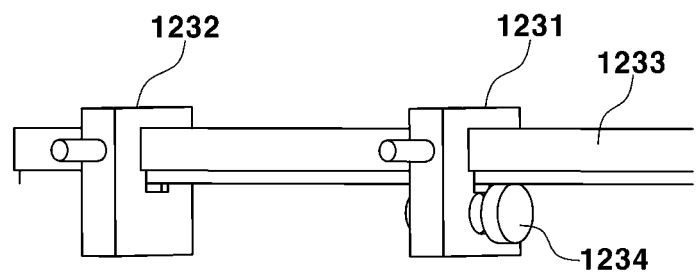
FIG. 5C is an enlarged view showing a fixing bracket of the independent suspension system according to another embodiment of the present disclosure.

FIG. 5C shows a distance adjustment screw 1233, which is implemented as a rack gear, as another embodiment of the present disclosure.

The distance adjustment screw 1233 includes a region formed as a rack gear, and the rack-gear region is engaged with a pinion gear provided on a driving shaft of a height adjustment part 1234.

The distance adjustment screw 1233 including the rack-gear region penetrates a fixing bracket 1231 and a guide bracket 1232. Therefore, when the pinion gear of the height adjustment part 1234 is rotated, the distance between the guide bracket 1232 and the fixing bracket 1231 is varied.

Figure 5D:
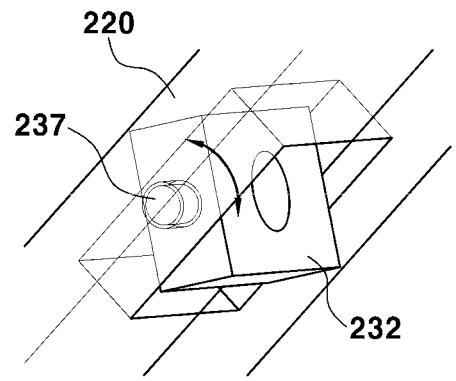
FIG. 5D is an enlarged view showing a guide bracket of the independent suspension system according to an embodiment of the present disclosure.

As shown in FIG. 5D, the guide bracket 232 includes guide protrusions 237, which are formed on opposite side surfaces thereof that face the inner surface of the opening in the second upper arm 220. The guide protrusions 237 serve as rotation shafts of the guide bracket 232. The guide bracket 232 includes therein a through-hole, the inner surface of which is in contact with the distance adjustment screw 233.

When the distance adjustment screw 233 is rotated, the guide bracket 232 is moved in the longitudinal direction of the distance adjustment screw 233. At this time, the guide bracket 232 is rotated about the guide protrusions 237 relative to the movement of the second upper arm 220, and is thus maintained perpendicular to the distance adjustment screw 233.

In summary, as shown in FIGS. 5B to 5D, the fixing bracket 231 and the guide bracket 232 face each other in the state of being parallel to each other, and the guide bracket 232 is moved in the longitudinal direction of the distance adjustment screw 233 upon rotation of the distance adjustment screw 233. Further, the second upper arm 220 and the first upper arm 210 are moved simultaneously in response to the movement of the guide bracket 232, so the distance therebetween is varied.

Furthermore, since the fixing bracket 231 and the guide bracket 232 are rotatable relative to the inner surface of the opening in the first upper arm 210 and the inner surface of the opening in the second upper arm 220, the fixing bracket 231 and the guide bracket 232 face each other in the state of being parallel to each other at all times, irrespective of rotation of the distance adjustment screw 233.

Figure 5E:
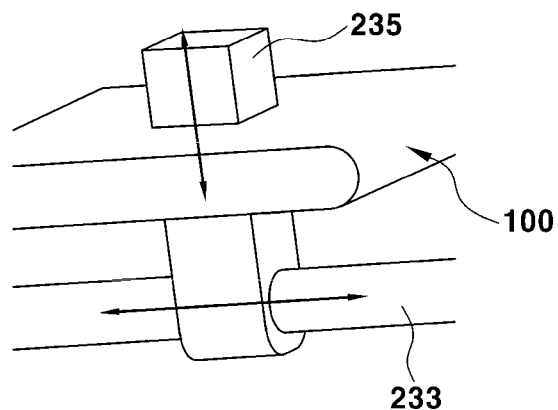
FIG. 5E is a view showing a guide of the independent suspension system according to an embodiment of the present disclosure.

FIG. 5E shows the guide 235 configured to guide variation in the position of the distance adjustment screw 233 in the height direction according to variation in the distance between the first upper arm 210 and the second upper arm 220.

The guide 235 is engaged with a portion of the distance adjustment screw 233, which is positioned between the fixing bracket 231 and the guide bracket 232, and penetrates the steering unit 100. When the distance adjustment screw 233 is rotated, the angle formed by the first and second upper arms 210 and 220 and the steering unit 100 is changed, and accordingly, the distance adjustment screw 233 is moved in the height direction. In order to guide the movement of the distance adjustment screw 233 in the height direction, the guide 235 is disposed so as to penetrate the steering unit 100.

When the distance adjustment screw 233 is rotated such that the distal end of the first upper arm 210 and the distal end of the second upper arm 220 move away from each other, the distance adjustment screw 233 is moved downwards in the height direction, and the guide 235 is integrally moved with the distance adjustment screw 233 in the direction in which the distance adjustment screw 233 is moved.

On the other hand, when the distance adjustment screw 233 is rotated such that the distal end of the first upper arm 210 and the distal end of the second upper arm 220 move close to each other, the distance adjustment screw 233 is moved upwards in the height direction, and the guide 235 is integrally moved with the distance adjustment screw 233 in the direction in which the distance adjustment screw 233 is moved.

That is, the guide 235 is disposed so as to penetrate the steering unit 100 in order to guide the movement of the distance adjustment screw 233 in the height direction.

Figure 6:
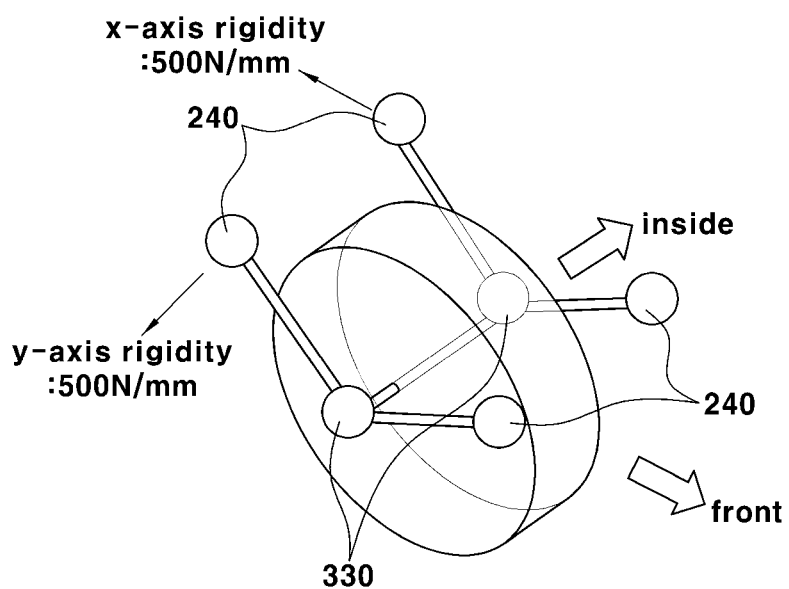
FIG. 6 is a view showing the engagement position of a bush in the independent suspension system according to an embodiment of the present disclosure.

FIG. 6 is a view showing the engagement position of a bush in the independent suspension system 10 according to an embodiment of the present disclosure.

When a vehicle travels, side force is generated in the lateral direction and is applied to the inner side of the wheel, and toe variation corresponding thereto occurs. The toe variation is a factor related to driving stability when a vehicle turns. In order to respond to toe variation, the independent suspension system 10 of the present disclosure includes bushes, which are provided at the positions at which the first and second shock absorbers 310 and 320 are engaged with the central shaft of the wheel 400 on opposite side surfaces of the wheel 400 and the positions at which the first and second shock absorbers 310 and 320 are engaged with the first and second upper arms 210 and 220.

Specifically, wheel bushes 330 are provided at the positions at which the first and second shock absorbers 310 and 320 are engaged with the central shaft of the wheel 400, and support bushes 240 are provided at the positions at which the first and second shock absorbers 310 and 320 are engaged with the first and second upper arms 210 and 220.

The rigidity of the wheel bushes 330 and the support bushes 240 may be set so as to enable control of toe-in or toe-out of the wheel 400 and positive camber or negative camber of the wheel 400 together with the spring stiffness of the shock absorber 300.

That is, the independent suspension system 10 of the present disclosure includes the shock absorber 300, composed of four rods, and the bushes provided at six positions, and thus is capable of controlling toe-in/out and the range of camber of the wheel when a vehicle travels or brakes.

Figure 7:
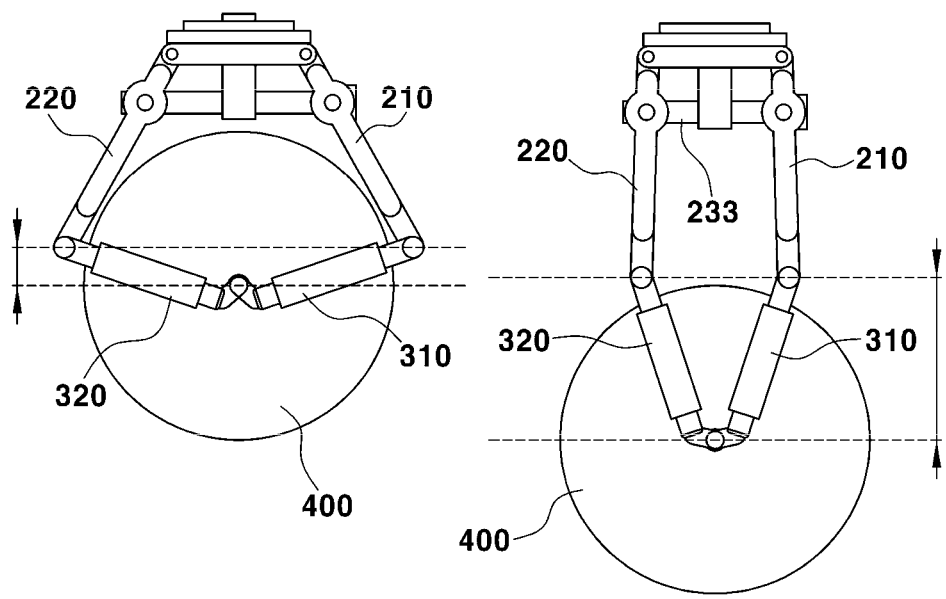
FIG. 7 is a view showing the operation of the independent suspension system according to an embodiment of the present disclosure.

FIG. 7 shows the operation of the independent suspension system 10, in which the distance between the steering unit 100 and the wheel 400 is varied by the ground clearance adjustment unit 230 of the link unit 200.

When the distance adjustment screw 233 is rotated in one direction such that the fixing bracket 231 and the guide bracket 232 are located closest to each other, the steering unit 100 is moved to the lowest position in the height direction, and is thus located closest to the wheel 400. Further, the first upper arm 210 and the second upper arm 220 are located farthest from each other in the longitudinal direction, and the shock absorber 300 is oriented substantially horizontally, whereby the extent to which the shock absorber 300 bumps is minimized. As a result, the vehicle is capable of traveling while maintaining soft comfortable ride.

On the other hand, when the distance adjustment screw 233 is rotated in the opposite direction, the steering unit 100 is located farthest from the wheel 400, and the first upper arm 210 and the second upper arm 220 are located closest to each other. At this time, as shown in the right drawing in FIG. 7, the first upper arm 210 and the second upper arm 220 are oriented substantially upright in the height direction.

In a state in which the distance between the wheel 400 and the steering unit 100 is maximized, the shock absorber 300 stands substantially upright in the height direction, and the extent to which the shock absorber 300 bumps increases. Therefore, the shock absorber 300 may absorb most of the impact caused by the road conditions.

As described above, in the independent suspension system 10 of the present disclosure, the distance between one end the first upper arm 210 and one end of the second upper arm 220 is varied by the rotational force generated by the height adjustment part 234, and accordingly, the stroke ratio of the shock absorber 300 is varied, thereby effectively responding to various travel environments.

As is apparent from the above description, the present disclosure provides the following effects through the above embodiments and through the configurations and combination and use relationships described above.

The independent suspension system of the present disclosure is capable of varying the distance between a vehicle body and a wheel depending on the environment in which a vehicle travels, thereby improving ride comfort.

In addition, the independent suspension system of the present disclosure has sufficient rigidity along three axes, thereby exhibiting improved turning stability and high braking performance.

The above description is illustrative of the present disclosure. The above disclosure is intended to illustrate and explain preferred embodiments of the present disclosure, and the present disclosure may be used in various other combinations, modifications, and environments. In other words, the present disclosure may be changed or modified within the scope of the concept of the disclosure disclosed herein, within the equivalent scope of the disclosure, and/or within the skill and knowledge of the art. The described embodiments illustrate the best state of the art to implement the technical idea of the present disclosure, and various changes may be made thereto as demanded for specific applications and uses of the present disclosure. Accordingly, the above description is not intended to limit the present disclosure to the embodiments. The appended claims should be construed as encompassing such other embodiments.

What is claimed is:

1. An independent suspension system, comprising:
a steering unit configured to adjust a steering angle of a wheel;
a shock absorber engaged with the wheel in order to absorb impacts applied to the wheel, the shock absorber comprising a first shock absorber and a second shock absorber, each of which arranged in a forward-rearward direction on opposite side surfaces of the wheel; and
a link unit disposed between the shock absorber and the steering unit, the link unit being configured to vary a distance between the wheel and the steering unit,
wherein the link unit comprises:
a first upper arm disposed between the first shock absorber and the steering unit;
a second upper arm disposed between the second shock absorber and the steering unit; and
a ground clearance adjustment unit engaged with the first upper arm and the second upper arm, the ground clearance adjustment unit being configured to vary a distance between the first upper arm and the second upper arm.

2. The independent suspension system of claim 1, wherein the steering unit is configured to control a steering angle to be applied to the wheel by a steering input part located at a vehicle body.

3. The independent suspension system of claim 1, wherein the ground clearance adjustment unit comprises:
a fixing bracket disposed in an opening in the first upper arm;
a guide bracket disposed in an opening in the second upper arm;
a height adjustment part engaged with the fixing bracket; and
a distance adjustment screw engaged with the fixing bracket and the guide bracket, the distance adjustment screw having one end connected with the height adjustment part so as to be rotated by driving force of the height adjustment part, and
wherein, as the distance adjustment screw rotates, a distance between the fixing bracket and the guide bracket is varied.

4. The independent suspension system of claim 3, further comprising:
a guide extending through the steering unit and engaged with the distance adjustment screw,
wherein the guide is configured to move with the distance adjustment screw in an upward-downward direction according to rotation of the distance adjustment screw.

5. The independent suspension system of claim 3, wherein the fixing bracket comprises fixing protrusions on opposite side surfaces of the fixing bracket so as to be engaged with the first upper arm, and
wherein, when the distance adjustment screw is rotated, the fixing bracket is configured to rotate about the fixing protrusions relative to inclination of the first upper arm such that the distance adjustment screw is maintained in a horizontal orientation.

6. The independent suspension system of claim 5, wherein the guide bracket comprises guide protrusions on opposite side surfaces of the guide bracket, and wherein the guide bracket is configured to rotate about the guide protrusions so as to face the fixing bracket.

7. The independent suspension system of claim 1, wherein, as the first upper arm and the second upper arm move closer to each other with respect to ends of the first upper arm and the second upper arm, respectively, the ends being engaged with the steering unit, a distance between the steering unit and the wheel becomes greater.

8. The independent suspension system of claim 1, wherein, as the first upper arm and the second upper arm move farther from each other with respect to ends of the first upper arm and the second upper arm, respectively, the ends being engaged with the steering unit, a distance between the steering unit and the wheel becomes smaller.

9. The independent suspension system of claim 1, further comprising a wheel bush disposed at a position at which the wheel and the shock absorber are engaged with each other.

10. The independent suspension system of claim 1, further comprising a support bush disposed at a position at which the shock absorber and the steering unit are engaged with each other.

11. The independent suspension system of claim 3, wherein the distance adjustment screw comprises a rack-gear configured to vary a distance between the fixing bracket and the guide bracket according to a rotational force of the height adjustment part.

12. The independent suspension system of claim 11, wherein the height adjustment part includes a pinion gear configured to engage with the rack-gear.

* * * * *